United States Patent
Espeseth et al.

(10) Patent No.: US 6,681,289 B2
(45) Date of Patent: Jan. 20, 2004

(54) SYSTEM AND METHOD FOR EFFICIENTLY SORTING DASD QUEUED COMMANDS WITH UNKNOWN ROTATIONAL LATENCY

(75) Inventors: Adam Michael Espeseth, Rochester, MN (US); David Robison Hall, Rochester, MN (US); Maile Matsui Vasoli, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 191 days.

(21) Appl. No.: 10/057,110

(22) Filed: Jan. 25, 2002

(65) Prior Publication Data
US 2003/0158996 A1 Aug. 21, 2003

(51) Int. Cl.[7] ............................................. G06F 12/00
(52) U.S. Cl. ................... 711/112; 711/111; 711/151; 711/158; 711/167; 710/6; 710/39; 710/40; 710/310
(58) Field of Search ....................... 711/111, 112, 114, 711/158, 167; 710/6, 39, 40, 310

(56) References Cited

U.S. PATENT DOCUMENTS

| | | | | |
|---|---|---|---|---|
| 6,145,052 A | * | 11/2000 | Howe et al. | 711/112 |
| 6,571,298 B1 | * | 5/2003 | Megiddo | 710/5 |
| 6,574,676 B1 | * | 6/2003 | Megiddo | 710/5 |
| 6,604,178 B1 | * | 8/2003 | Hall | 711/167 |

* cited by examiner

Primary Examiner—Donald Sparks
Assistant Examiner—Ngoc V Dinh
(74) Attorney, Agent, or Firm—Joan Pennington (57) ABSTRACT

A method and apparatus are provided for efficiently sorting queued commands with unknown rotational latency in a direct access storage device (DASD). For each command an initial expected access time (EAT) including a probability of success calculation is calculated and stored in a miss table. An actual starting location for the next command to be executed is identified. Utilizing the miss table, and a calculated best candidate command list for a plurality of different starting locations, a command in a command queue is selected based upon the actual starting location. The best candidate command list for a plurality of different starting locations is calculated by first sorting the miss table row by increasing EAT values and sequentially incrementing a miss time value by the predefined unit of time and updating all variable in the first row and adjusting a potential value in the second row of the miss table.

20 Claims, 11 Drawing Sheets

ARRIVAL BANDS (SIDs) 132

| SEEK DISTANCE (CYLINDER GROUPS) 134 | 0-2 MAKE | 0-2 MISS | 3-5 MAKE | 3-5 MISS | 6-8 MAKE | 6-8 MISS | 9 MAKE | 9 MISS |
|---|---|---|---|---|---|---|---|---|
| 0-30 | 4 | 2 | 9 | 0 | 4 | 0 | 72 | 6 |
| 31-91 | 4 | 1 | 6 | 0 | 2 | 0 | 98 | 5 |
| 92-182 | 9 | 7 | 5 | 0 | 4 | 0 | 150 | 4 |
| 183-303 | 27 | 5 | 13 | 1 | 15 | 1 | 208 | 4 |
| 304-454 | 36 | 5 | 16 | 1 | 14 | 4 | 236 | 11 |
| 455-635 | 21 | 10 | 8 | 7 | 15 | 6 | 224 | 14 |
| 636-846 | 23 | 11 | 18 | 2 | 14 | 2 | 153 | 8 |
| 847-1087 | 42 | 13 | 14 | 3 | 10 | 2 | 173 | 6 |
| 1088-1358 | 42 | 13 | 18 | 3 | 17 | 2 | 221 | 8 |
| 1359-1559 | 62 | 19 | 26 | 3 | 30 | 3 | 238 | 7 |
| 1560-1990 | 67 | 25 | 22 | 1 | 22 | 2 | 163 | 3 |

FIG. 1B

MISS TABLE 128

| QUEUE SLOT 140 | EAT 142 | LATENCY 144 | PENALTY 146 | MARGIN 148 | UPDATE INDEX 150 | POTENTIAL 152 |
|---|---|---|---|---|---|---|
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |

SYSTEM AND METHOD FOR EFFICIENTLY SORTING DASD QUEUED COMMANDS WITH UNKNOWN ROTATIONAL LATENCY

FIELD OF THE INVENTION

The present invention relates generally to command queue ordering in a direct access storage device (DASD), and more particularly, relates to a method and apparatus for efficiently sorting DASD queued commands with unknown rotational latency.

DESCRIPTION OF THE RELATED ART

In random access storage devices, such as hard disk drives, when more there are than one command to execute, the data to be accessed next is chosen from a list or a queue of outstanding commands. The hard disk drive includes firmware performing a scheduling algorithm to determine the optimal command execution order. In general, the goal of the scheduling algorithm is to minimize the average access time for its commands. Presently, many known hard disk drives use a Shortest-Access Time First (SATF) algorithm.

The conventional SATF algorithm works as follows: Given a set of commands in a queue, a command is chosen that can be started or accessed first. This calculation has two parts, the time to perform the seek and settle operation from the current cylinder to the target cylinder and the latency between this point and when the starting sector for the command is reached. The SATF algorithm depends on accurate estimates of this access time. If the estimate is too low, the actuator may settle on track after the desired sector has already passed rotationally. This is called a miss. A miss adds one full revolution to the access time, degrading performance. If the access time estimate is too high, the optimal command candidate is not chosen for execution.

One problem with the typical SATF algorithm is that each command in the queue is classified in a binary manner. Desirable candidates are determined to be either reachable or unreachable in a given number of revolutions. Unfortunately, due to the large number of external factors affecting actual seek performance binary decisions are inadequate.

An improved method and apparatus for hard disk drive command queue ordering utilizes the SATF algorithm together with a probability of success calculation. This improved algorithm chooses the command that has the shortest access time as well as an acceptable probability of success. The probability of success is the probability that the command will be executed in the expected amount of time without one or more missed revolutions.

A problem with the known algorithms results when the current command does not complete as expected. The SATF algorithm assumes that the anticipated ending sector of the current command can be accurately determined. However, the current command can stop at a location different from that expected. For example, the executing command may be aborted early causing the actual starting point to be earlier than expected, or the executing command may be several servo IDs (SIDs) longer than assumed with the actual starting point to be later than expected. Presently if the previous process does not complete as expected the process will try to execute this command again. Unfortunately, this means that whenever the current process terminates abnormally there is a potential for performance degradation caused by adding an additional revolution of time due to a miss or executing a non-optimal candidate command choice which also slows performance.

A need exists for an improved method and apparatus for command queue ordering DASD queued commands with unknown rotational latency.

SUMMARY OF THE INVENTION

A principal object of the present invention is to provide a method and apparatus for efficiently sorting queued commands with unknown rotational latency in a direct access storage device (DASD). Other important objects of the present invention are to provide such method and apparatus for efficiently sorting DASD queued commands substantially without negative effect and that overcome many of the disadvantages of prior art arrangements.

In brief, a method and apparatus are provided for efficiently sorting queued commands with unknown rotational latency in a direct access storage device (DASD). The sequential steps start with executing a current command and simultaneously with executing the current command for each command in a DASD command queue, an initial expected access time including a probability of success calculation is calculated and stored together with a plurality of predefined variables in a respective row in a miss table. Utilizing the stored miss table, a best candidate command list for a plurality of different starting locations for a next command to be executed is calculated. When an actual starting location for the next command to be executed is identified, a command in a DASD command queue is selected utilizing the best candidate command list, based upon the actual starting location.

In accordance with features of the invention, the initial expected access time is calculated for each command in the DASD command queue using a target starting location based upon the currently executing command. The best candidate command list for a plurality of different starting locations is calculated by first sorting the stored miss table rows by increasing expected access time (EAT) values. In the sorted miss table, a first row has a lowest EAT value and a second row has the second lowest EAT value. A last row of the sorted miss table stores the currently executing command. The best candidate command list for the plurality of different starting locations is calculated by sequentially incrementing a miss time value from the target starting location value by a predefined unit of time. The expected access time (EAT) and the stored predefined variables in the first row of the sorted miss table are updated and in the second row a potential variable is adjusted. The updated EAT in the first row is compared to the adjusted potential variable in the second row. When the updated EAT in the first row is not greater than the potential variable in the second row in the sorted miss table, then the miss time value is incremented by the predefined unit of time. When the updated EAT in the first row is greater than the potential variable in the second row in the sorted miss table, then the EAT and the stored predefined variables in the second row of the sorted miss table are updated. Then the miss table rows are again sorted by increasing expected access time values and a new entry is stored in the best candidate command list. Then the miss time value is incremented by the predefined unit of time and the sequential steps continue until the currently executing command is stored in the first row of the sorted miss table.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
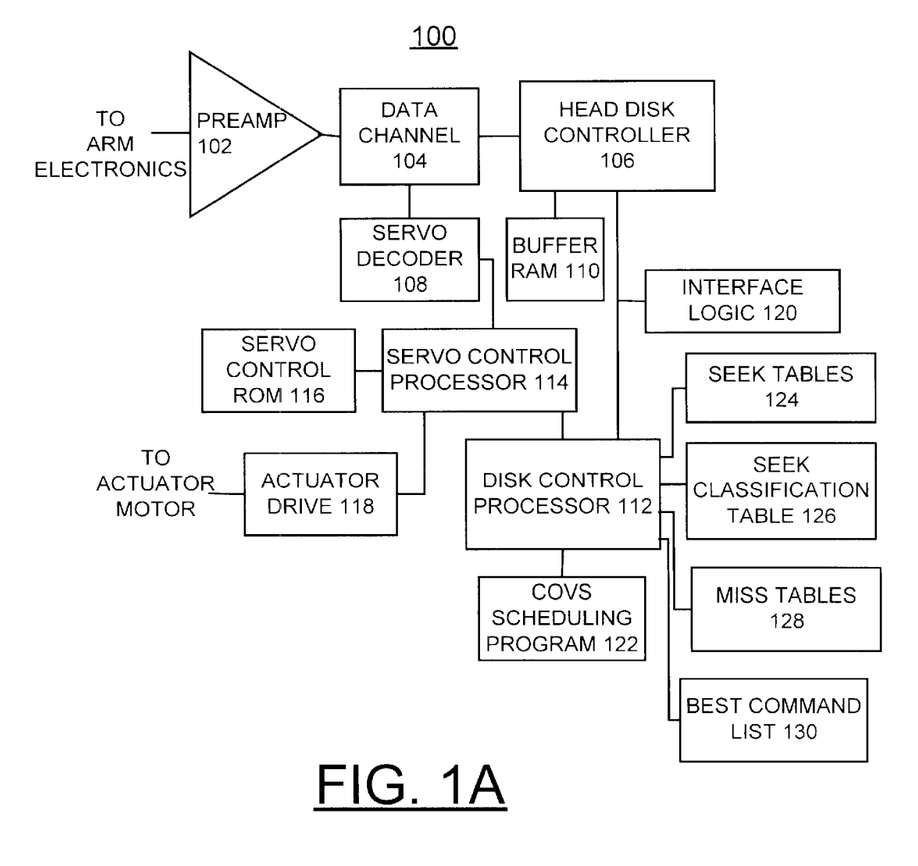
FIG. 1A is a block diagram representation illustrating a disk file system for implementing methods for implementing DASD command queue ordering with unknown rotational latency in accordance with the preferred embodiment.

Having reference now to the drawings, in FIG. 1A, there is shown direct access storage device (DASD) for carrying out the scheduling methods of the preferred embodiment generally designated by the reference character 100. Servo information and customer data are amplified by a preamplifier (preamp) 102. A data channel 104 uses sampling techniques for detecting the readback signals from the disk surfaces that contain the customer data. A head disk controller 106 is coupled to the data channel 104. A servo decoder 108 coupled to the data channel 104 provides a servo timing signal to the head disk controller 106. A buffer random access memory 120 is coupled to the head disk controller 106. A disk control processor 112 is coupled to the head disk controller 106 and to a servo control processor 114. A servo control read only memory (ROM) 116 and an actuator drive 118 are coupled to the servo control processor 114. The servo control processor 114 performs servo control functions providing servo positioning control signals to the actuator driver 118 that is coupled to an actuator motor assembly (not shown). An interface logic 120 coupled to the head disk controller 106 and the disk control processor 112 performs interface logic functions. Scheduling data accesses is provided with a command ordering for various starts (COVS) scheduling program 122 of the preferred embodiment coupled to the disk control processor 112. Seek tables 124, a seek classification table 126, a miss table 128, and a best candidate command list 130 of the preferred embodiment utilized by the COVS scheduling program 122 are coupled to the disk control processor 112. Disk control processor unit 112 is suitably programmed to execute the flow charts of FIGS. 2A, 2B, 2C and 2D of the preferred embodiment.

In accordance with features of the preferred embodiment, a COVS algorithm is implemented that provides an efficient way to determine the optimal command to execute, for example, when starting from every possible position on a given cylinder. A novel feature of this invention is that the expected access times for candidate commands are calculated assuming different starting positions while a current command is executing and these commands are ordered in the best command candidate list 130 to allow quickly jumping to an optimal choice once the starting location is known. This process is referred to as the command ordering for various starts algorithm or COVS of the preferred embodiment. The estimated ending location of the currently executing command is defined as the target starting point when calculating access times for candidate commands. The actual starting point will be on the same cylinder as the target plus or minus some latency between the actual starting point and the target starting point. This latency is defined as the miss time. As the current command executes the COVS algorithm of the preferred embodiment runs through the candidates and calculates expected access times from the target as well as other starting positions resulting from various latencies or miss times. There will be a best candidate for each miss time ranging from one unit of time to a maximum time of one revolution. It should be understood that the COVS algorithm of the preferred embodiment works with any defined unit of time, while one SID is used for in the following description. It should be noted that the latency between the actual and target starting points is only relevant mod 1 revolution, since a miss of five SIDs, for example, will take you to the same place on the disk as a miss of five SIDs plus one revolution. The candidates are stored in the best candidate command list 130 of the preferred embodiment in order of increasing miss times to allow an easy jump to an optimal best candidate once the starting location is known.

In accordance with features of the invention, initial calculations are updated and used to determine the best command for all possible miss locations rather than performing an additional sort for each possible starting point. This invention stores the data obtained when calculating an initial expected access times (EAT) for each of the candidate commands waiting in a DASD command queue. The data that would otherwise be discarded is placed into the miss table 128 as illustrated and described with respect to FIG. 1C. The miss table 128 stores the queued commands along with their corresponding times including EAT, time for the actuator to reach them (latency) and time waiting for the actuator head (margin) all relative to a set starting point or the target location. The miss table 128 also stores data for the command that is currently executing or the executing command, this currently executing command has an EAT of one revolution since it takes one revolution to reach the currently executing command again. Once created, the miss table 128 is sorted in order of increasing EAT using, for example, a method similar to a bubble sort. Thus, the first row is the best command when starting from the target location, the second row is the next best and so on. A simplied example portion of two exemplary rows of a miss table 128 is shown in the following Table A.

TABLE A

| Queue Slot | EAT | Latency | Margin |
|---|---|---|---|
| 11 | 38 | 38 | 10 |
| 4 | 43 | 43 | 22 |

Referring to Table A, the efficiency of this invention may be understood as follows. The COVS algorithm steps through miss times one unit at a time and adjusts the times of the first row. Once the EAT of row 1 is greater than the potential of row 2, row 2 is then updated relative to the new starting location defined by the miss time. If the EAT of row 1 is still greater than the EAT of row 2, a sort is done to filter the first row down to where it belongs among the other rows according to lowest EAT. In Table A, for example, a miss of 15 units means that command 11 is no longer possible to reach in one revolution since it only had 10 to spare, thus its EAT becomes (38−15)+1 revolution, while command 4 is reachable with a EAT of (43−15) units with 7 to spare. The EAT of 11 of row 1 is now larger than that of 4 of row 2 and a sort is done and the best command list 130 of the best command to choose relative to the miss time is formed. This process continues until the executing command becomes the best choice.

In accordance with features of the preferred embodiment, unlike a traditional command sorting method, the COVS algorithm is able to adjust the command times without constantly needing to refer to binary seek tables used for the initial EAT calculation. In addition, the COVS algorithm starts at the target and increases the distance from the target, thereby calculating the most likely arrival locations first. In the event that the COVS algorithm has already executed at the location of the actual start, the algorithm does not need to continue and will terminate. If it is found that the actual start is further than the COVS algorithm has time to iterate through, the algorithm can also terminate leaving the executing command as the next choice.

Figure 1B:
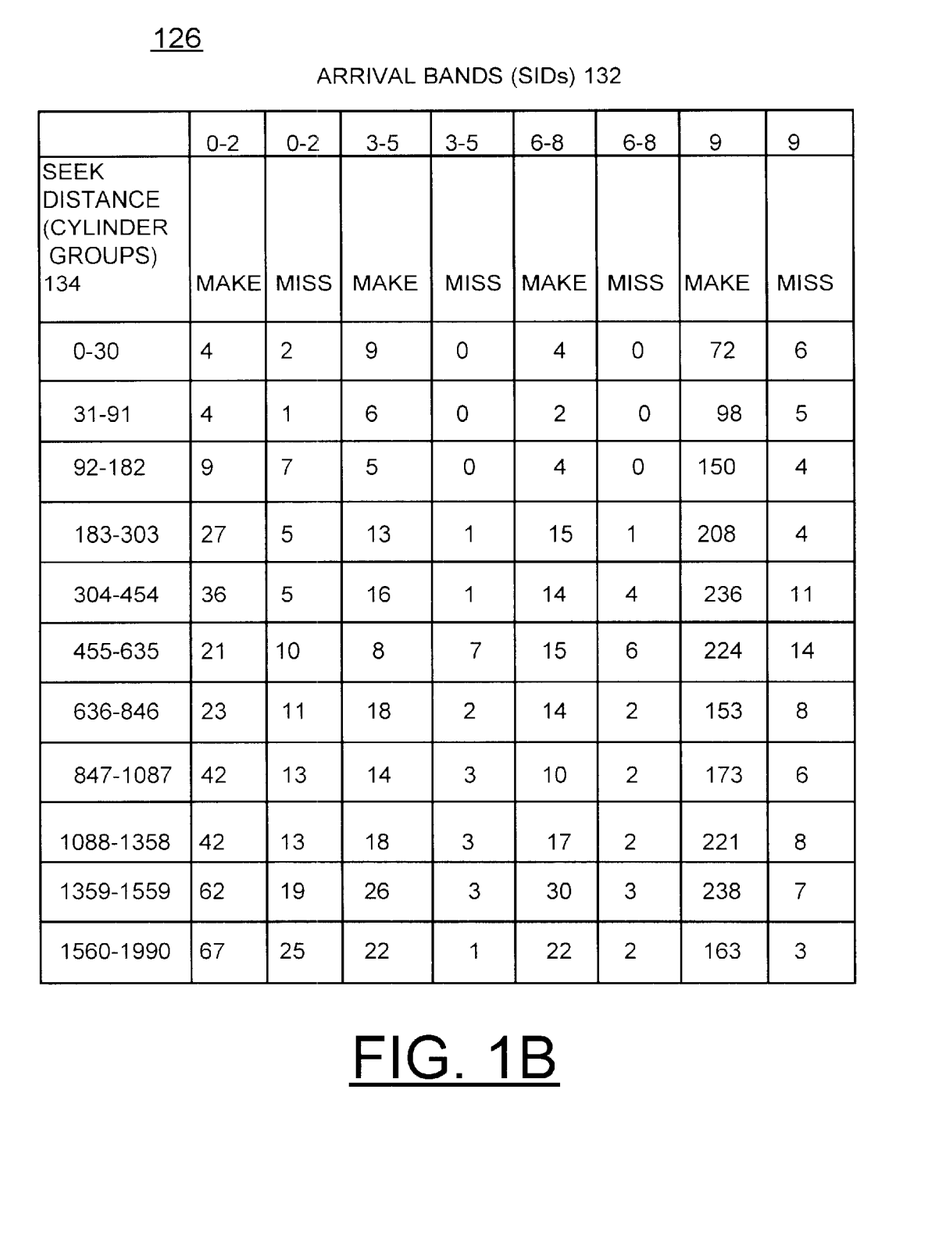
FIG. 1B is a diagram illustrating an example seek classification table for implementing DASD command queue ordering with unknown rotational latency in accordance with the preferred embodiment.

Referring now to FIG. 1B, there is shown an example seek classification table 126 for implementing DASD command queue ordering with unknown rotational latency in accordance with the preferred embodiment. When the drive's past performance history is stored and retrieved, it is classified according to the major factors that typify it. As shown in FIG. 1B, seek classification table 126 allows for memory space efficiency while maintaining expected access time accuracy. The main two dimensions used in classifying seeks are arrival bands 132 and seek distance or cylinder groups 134. Arrival bands 132 are groups of seeks that contain the same difference between the estimated seek time and the amount of time required to perform the seek. The arrival band 132 represents the difference in latency estimated to exist after the seek is complete. Cylinder groups 134 are groups of seeks that share the same seeking distance measured in cylinders. The arrival bands 132 are grouped linearly, while the cylinder groups 134 are grouped such that the same amount of rotational time is represented in each cylinder group. In other words, the groups are created in such a way that each cylinder group 134 corresponds to the same amount of seek table entries. For each entry in the arrival band 132 versus cylinder group 134 in the seek classification table 126, miss and make count values are stored.

The probability of a miss is calculated and stored in the two-dimensional array 126. Cylinder group 134 and arrival band 132 index the array 125. For any given candidate command, the cylinder group 134 is fixed based on the seek distance. The arrival band 132 is related to the number of extra SIDs, as defined by a binary seek profile. Extra SIDs indicate the amount of time that could be subtracted from the candidate command's latency while still allowing for successful completion of the seek without the penalty of an extra revolution. For any given candidate command, an Expected Access Time (EAT) calculation is performed when the estimated seek time is expected to be less than the time of one full revolution, the following equation is used:

Expected Access Time=Estimated Seek Time+(Probability of a Miss)*(Time of One Extra Revolution).

The estimated seek time variable is taken from a seek table 124 stored in memory. The probabilities of a miss variable are determined using make and miss data stored as the drive operates.

Figure 1C:
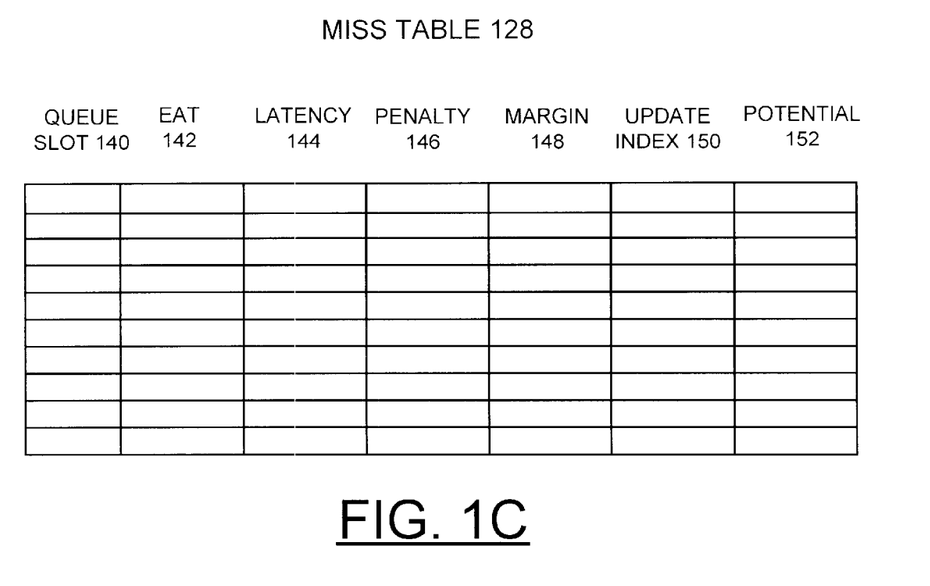
FIG. 1C is a diagram illustrating an example miss table for implementing DASD command queue ordering with unknown rotational latency in accordance with the preferred embodiment.

Referring now to FIG. 1C, there is shown an example miss table 128 for implementing DASD command queue ordering with unknown rotational latency in accordance with the preferred embodiment. This invention stores the data being calculated during the EAT algorithm. In the preferred embodiment, the miss table 128 stores candidate commands identified by a queue slot 140 along with their corresponding cost or EAT 142, latency 144, penalty 146, margin 148, update index 150 and potential 152 assuming a miss time of zero as defined below.

Cost or EAT 142—The expected access time when the estimated seek time is expected to be less than the time of one full revolution.

Latency 144—Rotation latency when settling on new command, as used by DEAT algorithm.

Penalty 146—(Probability of a miss)*(time of one extra revolution).

Margin 148—Amount of extra time as used in the EAT algorithm to find the arrival band.

Update index 150—Index variable used by the COVS algorithm to keep tract of the starting position for updating a miss table row.

Potential 152—Best possible expected access time for this command excluding any penalties.

When the EAT algorithm runs against queued commands that are in SID sorted order, only commands that cost less than or equal to one revolution are stored into the miss table 128. After the sort of the miss table 128 by lowest cost or EAT 142, the first row has the best command when starting from the target and the last row holds the executing command. The COVS algorithm works with a non SID sorted list of queued commands as well, the difference would be storing all commands into the miss table 128 and cutting out the commands with costs greater than one revolution after the sort.

An example of a miss table 128 created in this embodiment where the queue depth is 16 and the number of SIDs per revolution is 84 is shown in the following Table B. Here, the executing command is added into the queue in position 16 where the queue starts at zero and has the EAT 142 of the executing command is 1 revolution or 84 SIDs due to time waiting for the starting data sector for this executing command to pass under the actuator.

TABLE B

| Queue slot 140 | EAT 142 | Latency 144 | Penalty 146 | Margin 148 | Update Index 150 | Potential 152 |
|---|---|---|---|---|---|---|
| 8 | 37 | 35 | 2 | 13 | 0 | 37 |
| 28 | 38 | 31 | 7 | 3 | 0 | 38 |
| 12 | 40 | 38 | 2 | 18 | 0 | 40 |
| — | — | — | — | — | — | — |
| 16 | 84 | 84 | 0 | 84 | 0 | 84 |

The COVS algorithm then steps through miss times one SID at a time and adjusts all variables of the first row of the miss table 128 as shown in Table B. The potential of the second row is also adjusted until it is less than the cost of row 1, then all variables of row 2 are updated and compared to row 3. When the cost of row 2 is less than the potential of row 3 a sort rearranges the commands. This process continues until the executing command becomes the best choice. The executing command eventually becomes the best choice since the probability of a miss and likewise the penalty of the executing command is always zero.

For clarity the following shows Table B after a miss of 5 SIDs in the following Updated Table B After a miss of 5 SIDs as follows:

| Updated Table B After a miss of 5 SIDs | | | | | | |
|---|---|---|---|---|---|---|
| Queue slot | EAT | Latency | Penalty | Margin | Update index | Potential |
| 8 | 42 | 30 | 12 | 8 | 5 | 42 |
| 28 | 110 | 26 | 84 | 82 | 5 | 110 |
| 12 | 38 | 33 | 5 | 23 | 5 | 38 |
| — | — | — | — | — | — | — |
| 16 | 84 | 84 | 0 | 84 | 0 | 84 |

At 5 SIDs past the target, command 8 has an EAT of 42 which is larger than the potential of command 28 which has been adjusted and is now 33. Next row 2 is updated making the EAT of command 28 larger than the potential of command 12, thus row 3 is updated. The miss table rows are sorted by increasing EAT values. Row 2 is first sorted down through the table, putting command 12 into row 2. Row 1 is then sorted down the table, putting command 12 into the first row. Note that no row swaps were executed for misses of 0–4 SIDs. Thus, the first six entries of the resulting best candidate command list 130 are (8,8,8,8,8,12) so that for misses of 0–4 SIDs command 8 is the best command, and for a miss of 5 SIDs command 12 is the best command.

Figure 2A:
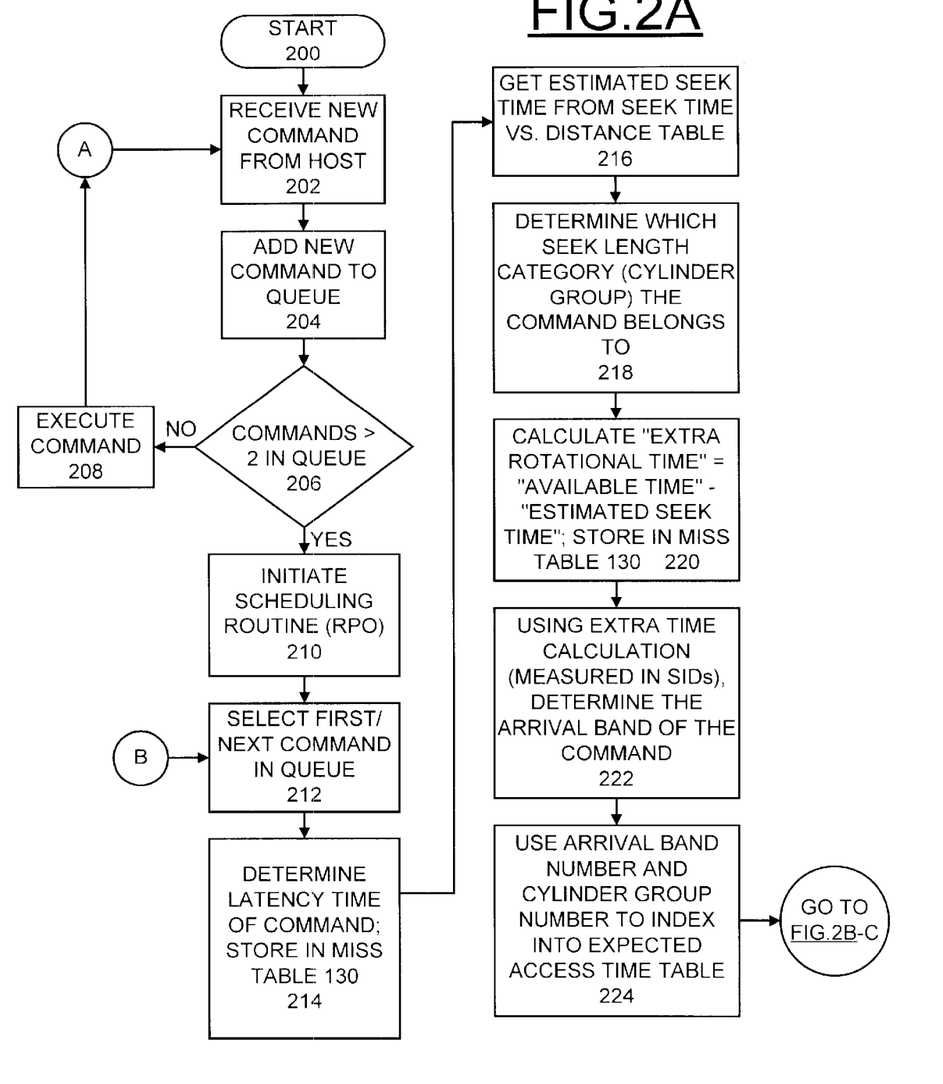
FIGS. 2A, 2B, 2C and 2D are flow charts illustrating exemplary sequential steps for implementing DASD command queue ordering with unknown rotational latency in accordance with the preferred embodiment.

Referring now to FIGS. 2A, 2B, 2C and 2D, there are shown exemplary sequential steps for implementing command queue ordering DASD queued commands with unknown rotational latency in accordance with the preferred embodiment. In FIG. 2A sequential steps start at a block 200. A new command from the host is received as indicated in a block 202. The new command from the host is added to the queue as indicated in a block 204. Checking whether more than two commands are in the queue is performed as indicated in a decision block 206. If not, then a command is executed as indicated in a block 208. Then the sequential operations return to block 202 following entry point A to receive a new command for the host.

When more than two commands are in the queue, then a scheduling routine for rotational position optimization (RPO) is initiated as indicated in a block 210. A first/next command in the queue is selected as indicated in a block 212. Next a latency time of the command is determined and is stored in the miss table 128 as indicated in a block 214. An estimated seek time from a seek time versus distance table 124 is obtained as indicated in a block 216. Which seek length category or cylinder group of the command is determined as indicated in a block 218. Then the extra rotational time equal to the available time minus the estimated seek time is calculated and is stored in the miss table 128 as indicated in a block 220. Using the extra time calculation measured in SIDs the arrival band 132 of the command is determined as indicated in a block 222. Next the arrival band 132 and cylinder group number 134 are used to index into expected access time table as indicated in a block 224. Then the sequential operations continue in FIG. 2B following entry point C.

Figure 2B:
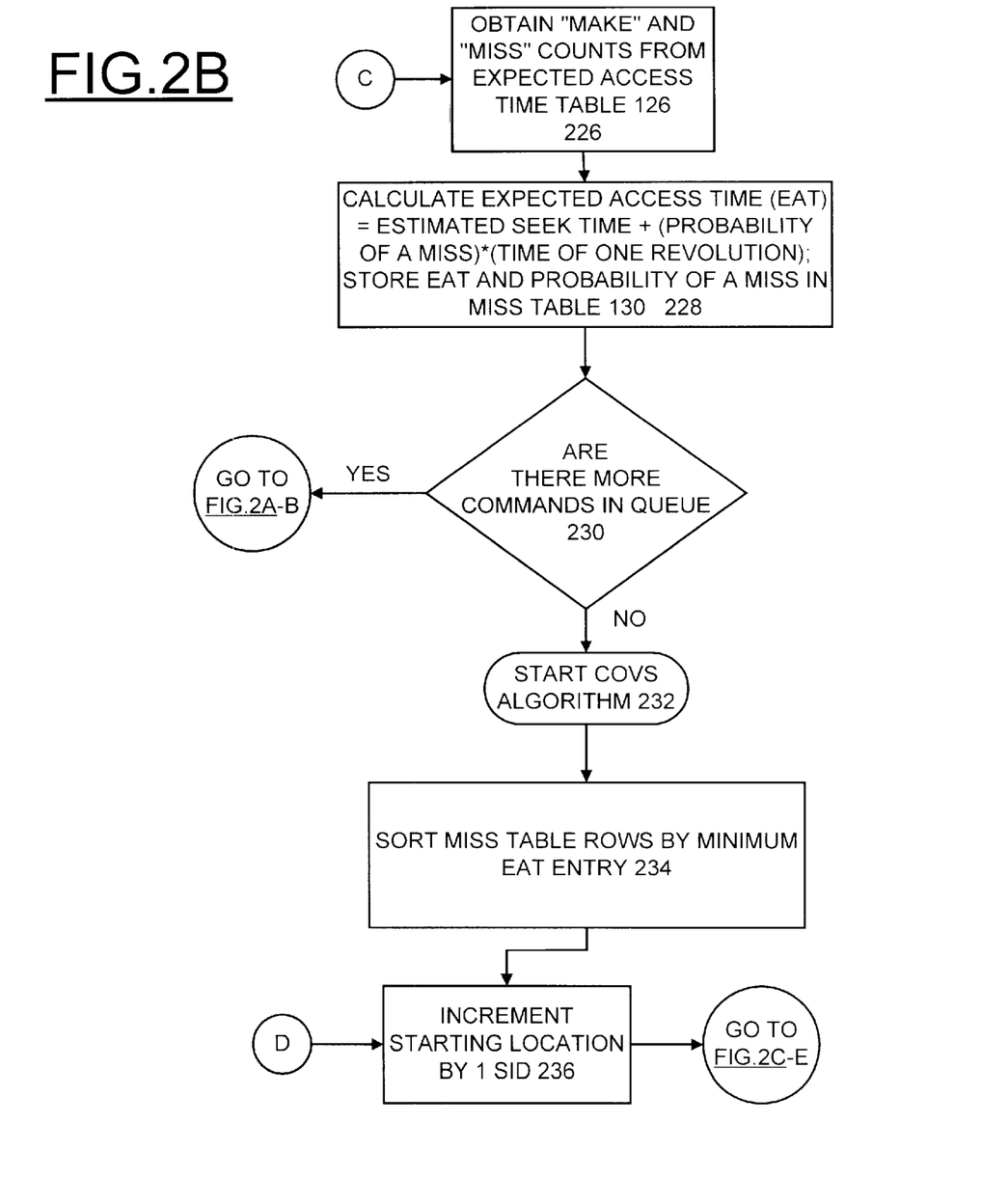

Referring to FIG. 2B, make and miss counts are obtained from expected access time table 126 as indicated in a block 226. Next the expected access time is calculated and is stored in the miss table 128 as indicated in a block 228, where the expected access time (EAT) equals the estimated seek time plus the result of the probability of a miss times the time of one revolution. After the expected access time is calculated at block 228, then it is determined whether there are more commands in the queue as indicated in a decision block 230. When there are more commands in the queue, then the sequential operations return to block 212 in FIG. 2A following entry point B. Otherwise, when there are no more commands in the queue, then the COVS algorithm starts as indicated in a block 232. The rows of the miss table 128 are sorted by a minimum EAT entry as indicated in a block 234. Then the starting location is incremented by 1 SID as indicated in a block 236. Then the sequential operations continue in FIG. 2C following entry point E.

Figure 2C:
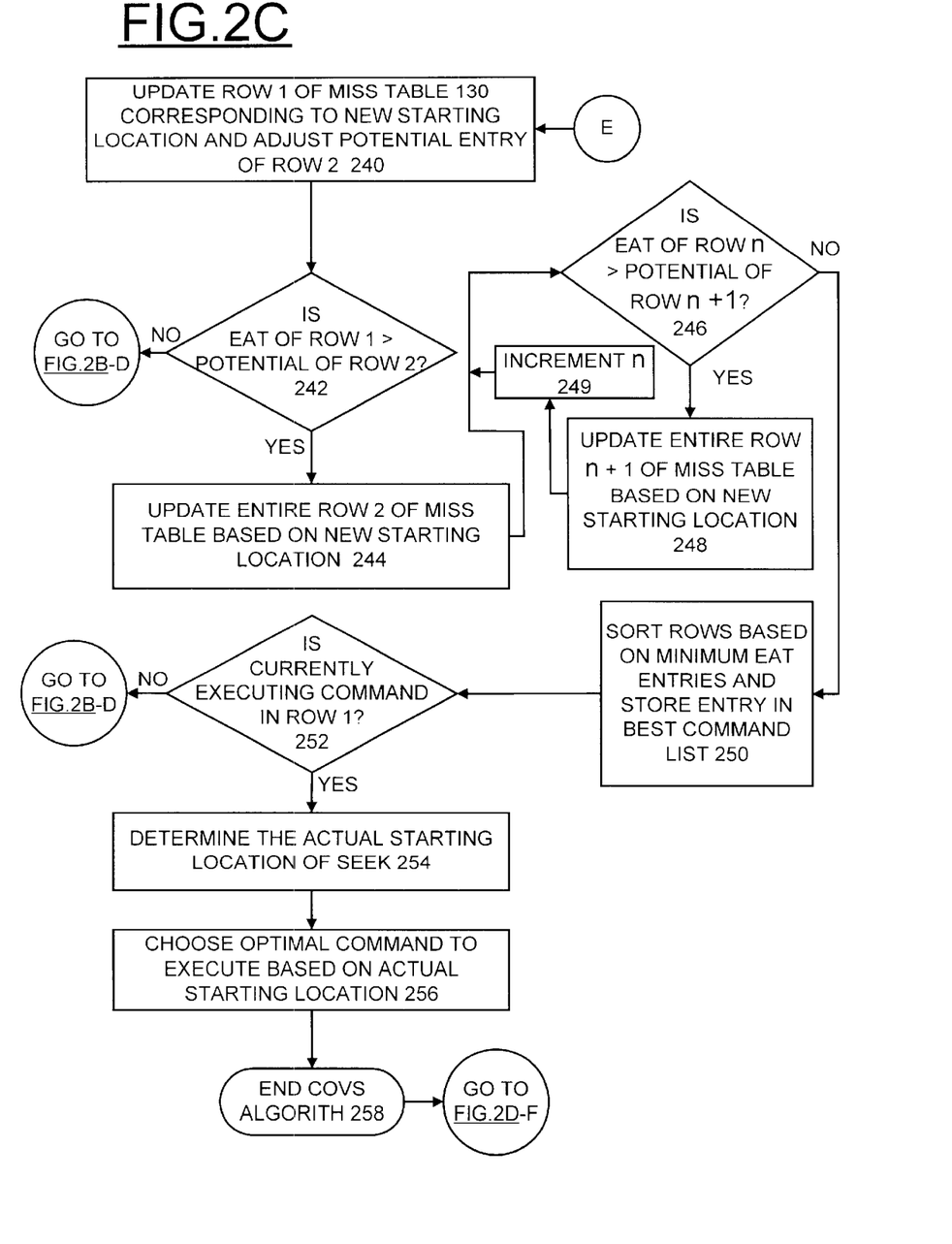

Referring to FIG. 2C following entry point E, then row 1 of the miss table 128 is updated corresponding to the new starting location and the potential of row 2 is adjusted as indicated in a block 240. Checking whether the EAT of row 1 is greater than the potential of row 2 is performed as indicated in a decision block 242. When the EAT of row 1 is not greater than the potential of row 2, then the sequential operations return to block 236 in FIG. 2B following entry point D and the starting location again is incremented by 1 SID. When the EAT of row 1 is greater than the potential of row 2, the entire row 2 of the miss table 128 is updated based on new starting location as indicated in a block 244. Checking whether the EAT of the current updated row n is now greater than the potential of the next row n+1 is performed as indicated in a decision block 246. When the EAT of row n is greater than the potential of the next row n+1, then the entire row n+1 is updated in the miss table 128 as indicated in a block 248. Then n is incremented by 1 as indicated in a block 249, then the sequential operations return to block 246 to check whether the EAT of the current updated row n is now greater than the potential of the next row n+1. This process continues until the EAT of the current updated row n is not greater than the potential of the next row n+1. When the EAT of row n is not greater than the potential of the next row n+1, then the rows of the miss table are sorted based on minimum EAT entries and a new entry is stored in the best command list as indicated in a block 250. Then checking whether the currently executing command is in row 1 of table 128 as indicated in a decision block 252. When the currently executing command is not in row 1 of table 128, then the sequential operations return to block 236 in FIG. 2B following entry point D. When the currently executing command is in row 1 of table 128, then the actual seek starting location is determined as indicated in a block 254. Next an optimal command to execute is chosen based on the actual starting location using the best command list as indicated in a block 256. The COVS algorithm ends as indicated in a block 258. Then the sequential operations continue in FIG. 2D following entry point F.

Figure 2D:
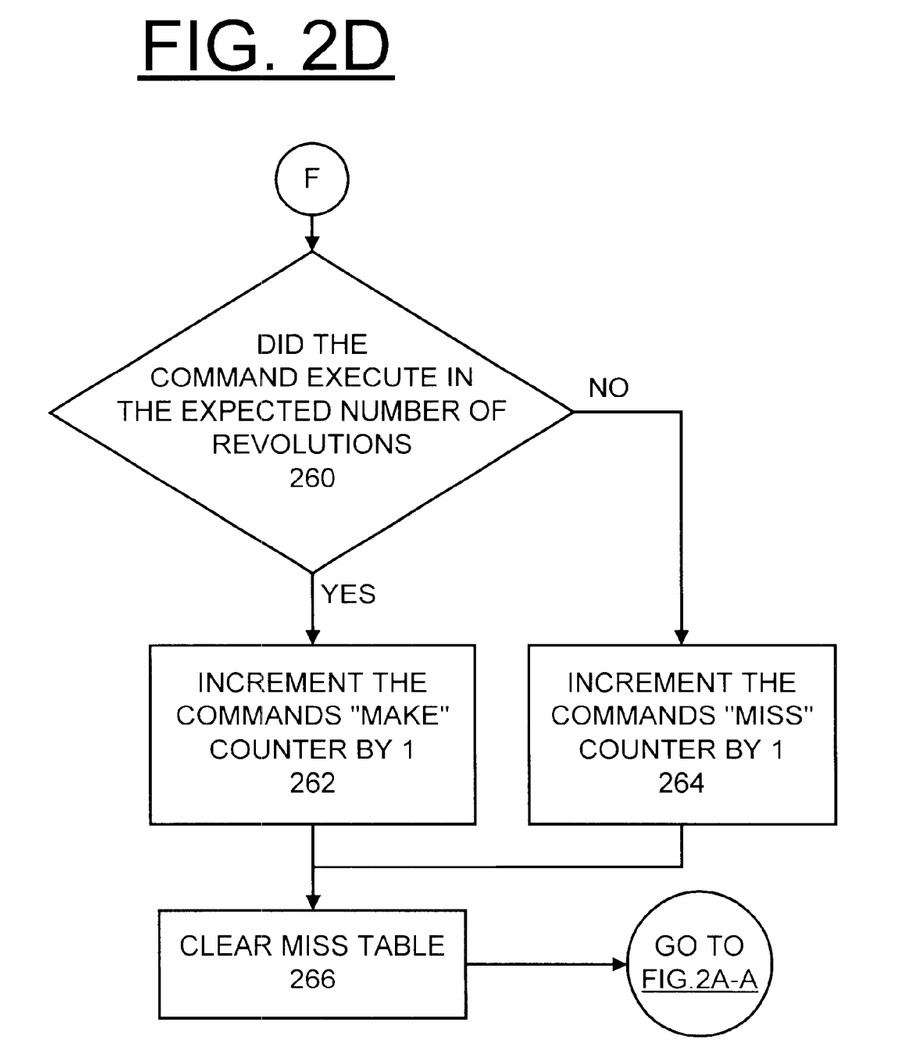

Referring to FIG. 2D following entry point F, checking whether the command executed in the expected number of revolutions is performed as indicated in a decision block 260. When the command executed in the expected number of revolutions, the make counter is incremented by one as indicated in a block 262. When the command did not execute in the expected number of revolutions, the miss counter is incremented by one as indicated in a block 264. The miss table 128 is cleared as indicated in a block 266. Then the sequential operations continue in FIG. 2A following entry point A to receive a new command from the host at block 202.

Figure 3A:
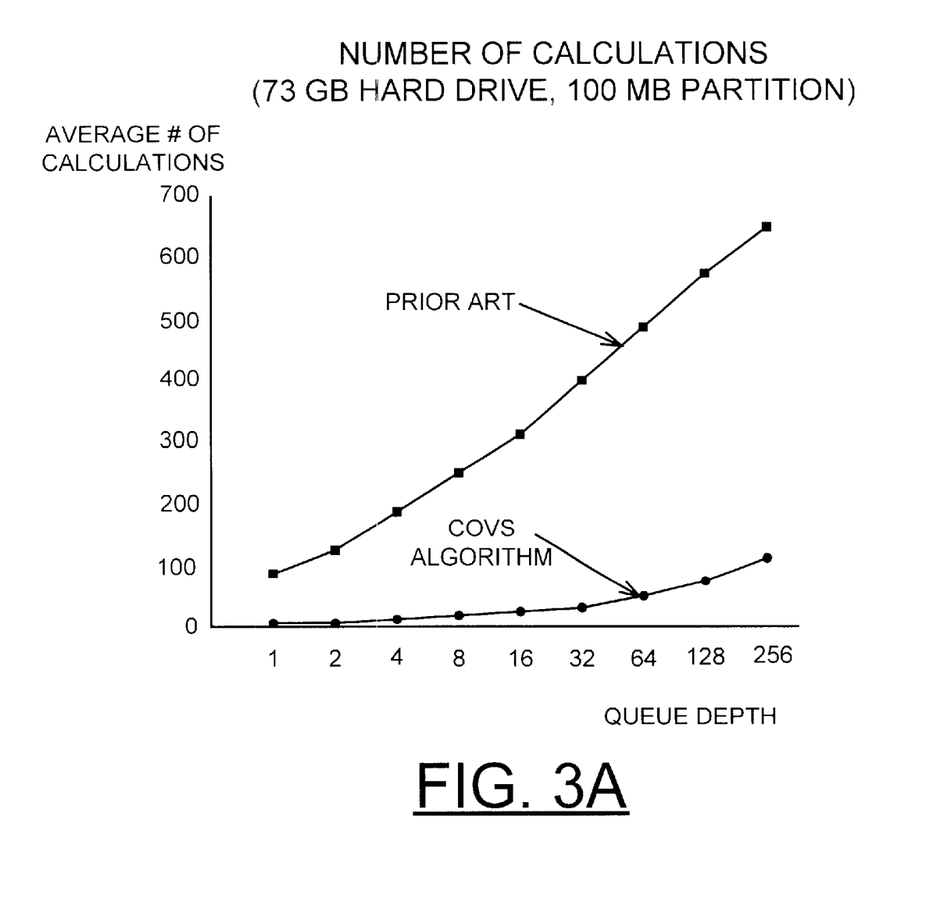
FIGS. 3A, 3B, and 3C are exemplary graphs illustrating a number of calculations required for implementing DASD command queue ordering with unknown rotational latency in accordance with the preferred embodiment relative to command queue depth for comparison with a conventional command queue ordering.
Figure 3B:
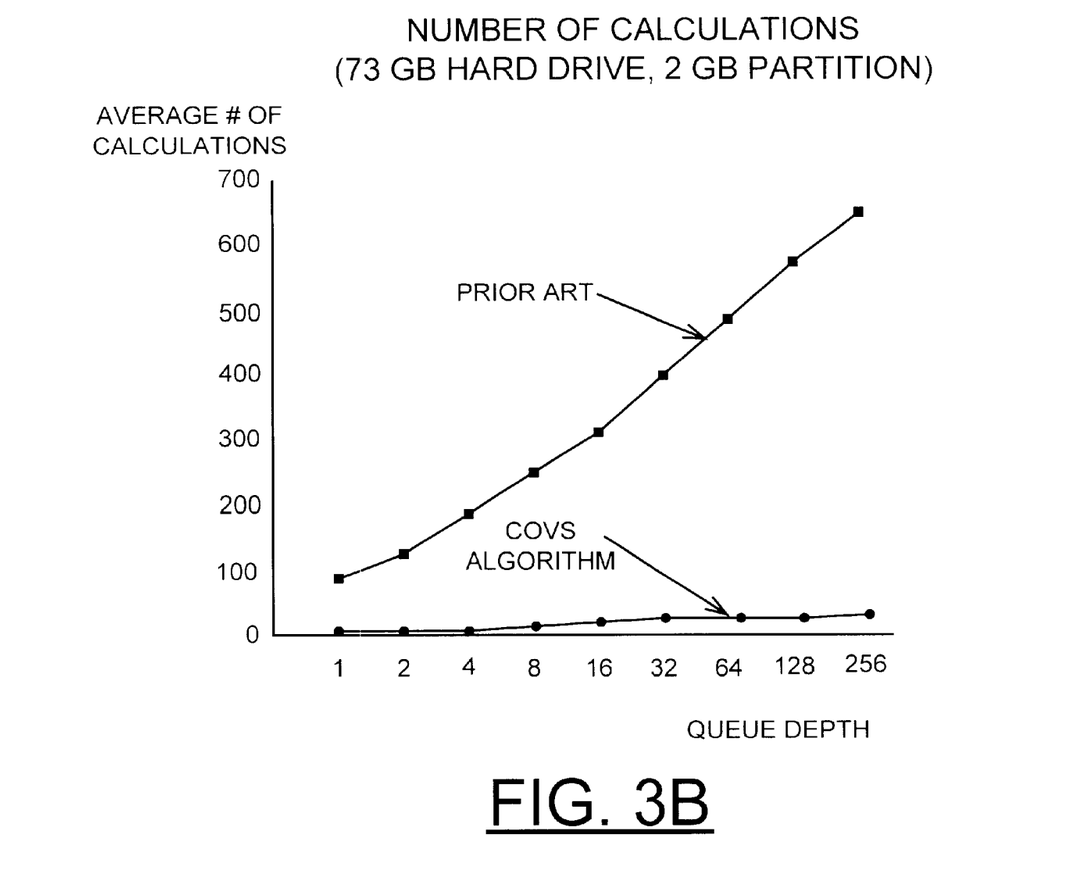
Figure 3C:
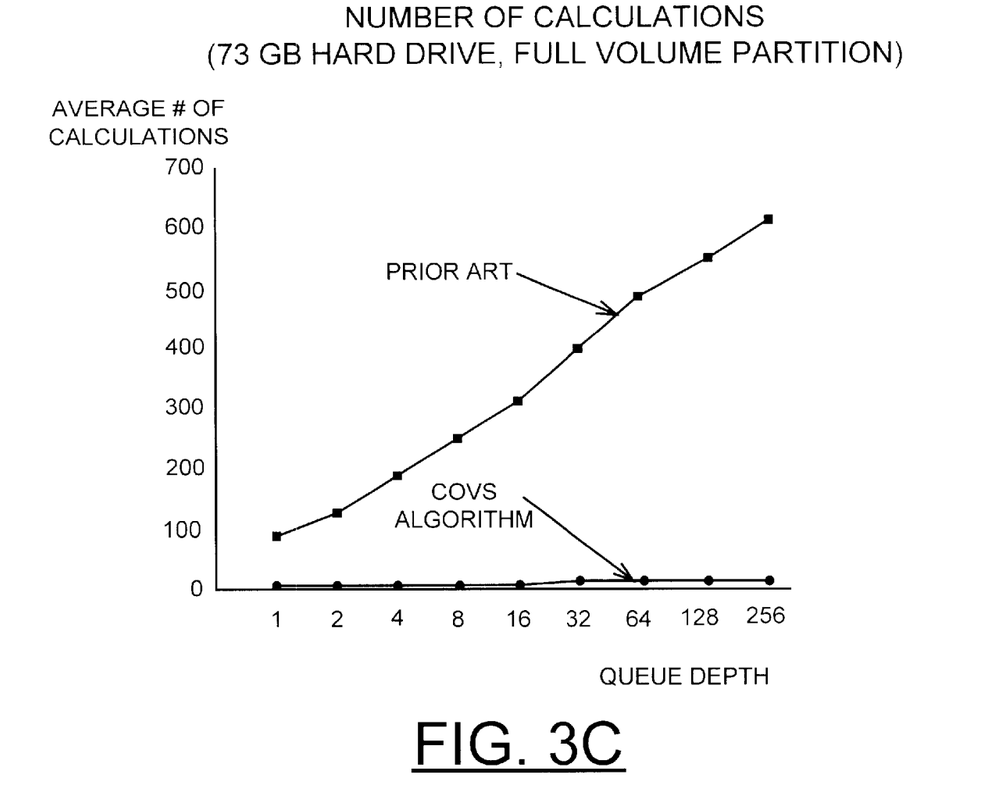

FIGS. 3A, 3B, and 3C are exemplary graphs illustrating a number of calculations required for implementing DASD command queue ordering with unknown rotational latency of the COVS algorithm in accordance with the preferred embodiment relative to command queue depth for comparison with conventional command queue ordering. The efficiency of the COVS algorithm of the preferred embodiment is apparent when considering the number of times an update involving the seek tables is done. After the miss table 128 has been built, updates to the EAT are only necessary when a command moves arrival bands. Thus, the algorithm of the preferred embodiment rarely requires accessing the seek tables unlike a traditional technique that accesses the seek table at a rapidly increasing rate relative to queue depth. FIGS. 3A, 3B, and 3C compare the average number of seek table references for the COVS algorithm to the prior art on a 73 GB hard drive at 100 MB, 2 GB and full volume partitions, respectively.

Figure 4:
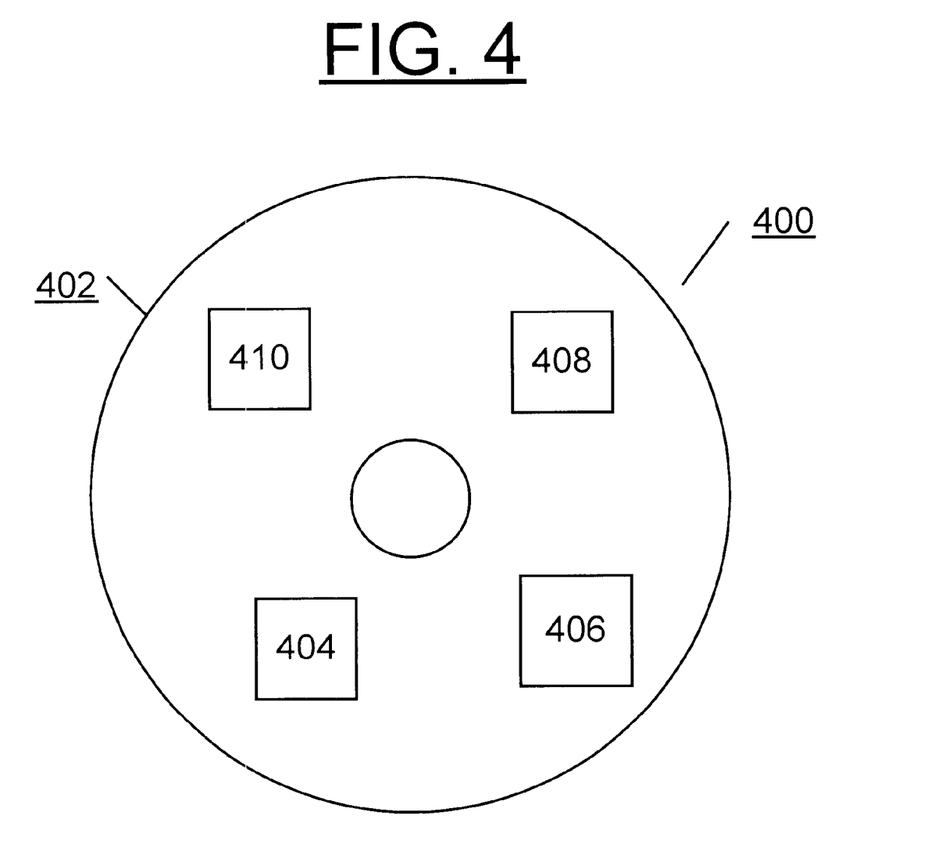
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the methods for implementing DASD command queue ordering with unknown rotational latency of the preferred embodiment in the system 100 of FIG. 1A.

A sequence of program instructions or a logical assembly of one or more interrelated modules defined by the recorded program means 404, 406, 408, 410, direct the DASD 100 for implementing DASD command queue ordering with unknown rotational latency of the preferred embodiment.

While the present invention has been described with reference to the details of the embodiments of the invention shown in the drawing, these details are not intended to limit the scope of the invention as claimed in the appended claims.

What is claimed is:

1. A method for efficiently sorting DASD queued commands with unknown rotational latency comprising the steps of:

executing a current command;
   for each command in a DASD command queue, simultaneously with executing said current command calculating an initial expected access time including a probability of success calculation and storing said calculated expected access time together with a plurality of predefined variables in a respective row in a miss table;
   utilizing said stored miss table, simultaneously with executing said current command calculating a best candidate command list for a plurality of different starting locations for a next command to be executed;
   identifying an actual starting location for said next command to be executed; and
   utilizing said best candidate command list for said plurality of different starting locations, selecting a command in a DASD command queue to execute for said actual starting location.

2. A method for efficiently sorting DASD queued commands with unknown rotational latency as recited in claim 1 wherein the step for each command in a DASD command queue, calculating an initial expected access time including a probability of success calculation includes the step of calculating an initial expected access time using a target starting location of an expected ending location of the currently executing command.

3. A method for efficiently sorting DASD queued commands with unknown rotational latency as recited in claim 1 wherein the step of calculating said best candidate command list for said plurality of different starting locations for said next command to be executed includes the step of sorting said miss table rows by a minimum calculated expected access time (EAT).

4. A method for efficiently sorting DASD queued commands with unknown rotational latency as recited in claim 3 includes the steps of sequentially incrementing a miss time value for said plurality of different starting locations for said next command to be executed.

5. A method for efficiently sorting DASD queued commands with unknown rotational latency as recited in claim 4 includes the steps for each incremented miss time value, updating said EAT and said plurality of predefined variables in a first row in said sorted miss table and adjusting a potential value in a second row in said sorted miss table.

6. A method for efficiently sorting DASD queued commands with unknown rotational latency as recited in claim 5 includes the steps for each incremented miss time value, comparing said updated EAT in said first row with said adjusted potential value in said second row in said sorted miss table.

7. A method for efficiently sorting DASD queued commands with unknown rotational latency as recited in claim 6 further includes the steps responsive to said updated EAT in said first row being greater than said adjusted potential value in said second row, updating said EAT and said plurality of predefined variables in said second row in said sorted miss table.

8. A method for efficiently sorting DASD queued commands with unknown rotational latency as recited in claim 7 further includes the steps of comparing said updated EAT in said second row with said potential in a third row of said sorted miss table; and responsive to said updated EAT in said second row being greater than said potential in said third row of said sorted miss table, updating said EAT and said plurality of predefined variables in said third row in said sorted miss table.

9. A method for efficiently sorting DASD queued commands with unknown rotational latency as recited in claim 7 further includes the steps of sorting said miss table rows by a minimum stored expected access time and storing a new entry in said best candidate command list.

10. A method for efficiently sorting DASD queued commands with unknown rotational latency as recited in claim 8 further includes the steps of sorting said miss table rows by a minimum stored expected access time and storing a new entry in said best candidate command list.

11. A method for efficiently sorting DASD queued commands with unknown rotational latency as recited in claim 6 further includes the steps responsive to said updated EAT in said first row not being greater than said adjusted potential value in said second row, incrementing said miss time value.

12. A method for efficiently sorting DASD queued commands with unknown rotational latency as recited in claim 9 further includes the steps of checking for said currently executing command being stored in said first row of said sorted miss table; and responsive to said currently executing command not being stored in said first row of said sorted miss table, incrementing said miss time value.

13. Apparatus in a direct access storage device (DASD) for efficiently sorting DASD queued commands with unknown rotational latency comprising:

a processor;
   said processor for executing a current command;

said processor for each command in a DASD command queue simultaneously with executing said current command, for calculating an initial expected access time (EAT) including a probability of success calculation and storing said calculated initial EAT together with a plurality of predefined variables in a respective row in a miss table;

said processor utilizing said stored miss table simultaneously with executing a current command, for calculating a best candidate command list for a plurality of different starting locations for a next command to be executed;

said processor for identifying an actual starting location for said next command to be executed; and said processor utilizing said best candidate command list for said plurality of different starting locations, for selecting a command in a DASD command queue to execute for said actual starting location.

14. Apparatus in a direct access storage device (DASD) for efficiently sorting DASD queued commands with unknown rotational latency as recited in claim 13 wherein said processor for calculating said initial expected access time (EAT) including said probability of success calculation and storing said calculated initial EAT together with said plurality of predefined variables in a respective row in a miss table includes said processor for calculating said initial expected access time (EAT) for a target starting location defined as an expected ending location of said currently executing command.

15. Apparatus in a direct access storage device (DASD) for efficiently sorting DASD queued commands with unknown rotational latency as recited in claim 13 wherein said processor utilizing said stored miss table simultaneously with executing said current command, for calculating said best candidate command list for said plurality of different starting locations for said next command to be executed includes said processor for sorting said stored miss table rows by a minimum stored EAT; and said processor for sequentially incrementing a miss time value for said plurality of different starting locations for said next command to be executed.

16. Apparatus in a direct access storage device (DASD) for efficiently sorting DASD queued commands with unknown rotational latency as recited in claim 15 wherein said processor for each said sequentially incremented miss time value, for updating said EAT and said plurality of predefined variables in a first row of said sorted miss table and for adjusting a potential value in a second row of said sorted miss table; and for comparing said updated EAT in said first row with said adjusted potential value in said second row.

17. Apparatus in a direct access storage device (DASD) for efficiently sorting DASD queued commands with unknown rotational latency as recited in claim 16 wherein said processor responsive to said updated EAT in said first row being greater than said adjusted potential value in said second row, for updating said EAT and said plurality of predefined variables in said second row of said sorted miss table.

18. Apparatus in a direct access storage device (DASD) for efficiently sorting DASD queued commands with unknown rotational latency as recited in claim 17 wherein said processor responsive to updating said EAT and said plurality of predefined variables in said second row of said sorted miss table, for sorting said miss table rows by a minimum stored EAT and for storing a new entry in said best candidate command list.

19. A computer program product for efficiently sorting queued commands with unknown rotational latency in a direct access storage device (DASD) including a processor unit, said computer program product including a plurality of computer executable instructions stored on a computer readable medium, wherein said instructions, when executed by said processor unit, cause the processor unit to perform the steps of:

executing a current command;

for each command in a DASD command queue, simultaneously with executing said current command, calculating an initial expected access time including a probability of success calculation and storing said calculated expected access time together with a plurality of predefined variables in a respective row in a miss table;

utilizing said stored miss table simultaneously with executing said current command, calculating a best candidate command list for a plurality of different starting locations for a next command to be executed;

identifying an actual starting location for said next command to be executed; and utilizing said best candidate command list for said plurality of different starting locations, selecting a command in a DASD command queue to execute for said actual starting location.

20. A computer program product for efficiently sorting queued commands with unknown rotational latency in a direct access storage device (DASD) as recited in claim 19 wherein said instructions, when executed by said processor unit, cause the processor unit to perform the steps of: for each command in said DASD command queue, storing said calculated expected access time together with a plurality of predefined variables in said respective row in said miss table includes the steps of storing a latency time, a penalty time, and a potential time, said potential time defined as a best possible expected access time without any penalties in said respective row in said miss table.

* * * * *